United States Patent
Chan et al.

(10) Patent No.: US 6,588,673 B1
(45) Date of Patent: Jul. 8, 2003

(54) METHOD AND SYSTEM PROVIDING IN-LINE PRE-PRODUCTION DATA PREPARATION AND PERSONALIZATION SOLUTIONS FOR SMART CARDS

(75) Inventors: Victor Chan, Mississauga (CA); Francis Ho, North Field (CA)

(73) Assignee: Mist Inc., Toronto (CA)

(*) Notice: Subject to any disclaimer, the term of this patent is extended or adjusted under 35 U.S.C. 154(b) by 0 days.

(21) Appl. No.: 09/500,239

(22) Filed: Feb. 8, 2000

(51) Int. Cl.[7] .............................................. G06K 19/06
(52) U.S. Cl. ..................... 235/492; 235/379; 235/380; 235/383
(58) Field of Search ................................. 235/492, 379, 235/380, 383

(56) References Cited

U.S. PATENT DOCUMENTS

| | | | |
|---|---|---|---|
| 4,969,760 A | | 11/1990 | LaManna et al. |
| 5,266,781 A | * | 11/1993 | Warwick et al. ............... 101/32 |
| 5,378,884 A | * | 1/1995 | Lundstrom et al. .......... 235/380 |
| 5,460,089 A | | 10/1995 | Kennedy |
| 5,503,514 A | | 4/1996 | LaManna et al. |
| 5,684,742 A | * | 11/1997 | Bublitz et al. ............... 235/492 |
| 5,837,991 A | | 11/1998 | LaManna et al. |
| 5,889,941 A | * | 3/1999 | Tushie et al. ................ 235/380 |
| 5,920,055 A | | 7/1999 | Roth et al. |
| 5,949,046 A | * | 9/1999 | Kenneth et al. ............. 235/380 |
| 6,014,748 A | * | 1/2000 | Tushie et al. ................ 257/679 |
| 6,018,717 A | * | 1/2000 | Lee et al. ....................... 705/13 |
| 6,196,459 B1 | * | 3/2001 | Goman et al. ............... 235/380 |
| 6,199,762 B1 | * | 3/2001 | Hohle .......................... 235/492 |
| 6,202,155 B1 | * | 3/2001 | Tushie et al. ................ 713/200 |
| 6,402,028 B1 | * | 6/2002 | Graham, Jr. et al. ........ 235/380 |

FOREIGN PATENT DOCUMENTS

| | | | |
|---|---|---|---|
| JP | 02000099649 A | * | 5/2000 |
| WO | WO 99/19846 | | 4/1999 |
| WO | WO 99/57675 | | 11/1999 |
| WO | WO 99/59109 | | 11/1999 |
| WO | WO 00/07154 | | 2/2000 |

* cited by examiner

*Primary Examiner*—Karl D. Frech
*Assistant Examiner*—Daniel Walsh
(74) *Attorney, Agent, or Firm*—Antonelli, Terry, Stout & Kraus, LLP

(57) ABSTRACT

An integrated card personalization system is provided using an "in-line" approach for seamless card personalization directly from cardholder data files to avoid duplication of hardware and eliminate the need for an overnight batch process to prepare cardholder data for card personalization. Such integrated card personalization system allows for the personalization of transaction cards such as smart cards on more flexible, low cost, low maintenance and smaller personalization systems so as to save the personalization bureau time and money, particularly on small volume production runs, and eliminate the need to hire and maintain internal software development staff with high attendant cost.

30 Claims, 5 Drawing Sheets

METHOD AND SYSTEM PROVIDING IN-LINE PRE-PRODUCTION DATA PREPARATION AND PERSONALIZATION SOLUTIONS FOR SMART CARDS

APPENDIX

An appendix containing a source code listing of control files of a pre-production data preparation (P3) and card personalization application program written in C program language for providing in-line pre-production data preparation and personalization solutions for transaction cards such as smart cards according to an embodiment of the present invention. The appendix contains subject matter that is copyrighted. A limited license is granted to anyone who requires a copy of the program disclosed therein for purposes of understanding or analyzing the present invention, but no license is granted to make a copy for any other purposes.

TECHNICAL FIELD

The present invention generally relates to data storage devices, and more specifically, relates to a method and system providing in-line pre-production data preparation and personalization solutions for transaction cards.

BACKGROUND

Transaction cards have been widely used for cardholders to gain access to a particular application service provided by card issuers such as banks and organizations which maintain databases of cardholder records. The service provided by card issuers may be the use of a credit or debit account, access to health care services, or a monetary value stored on the card to be used to purchase services, just to name a few.

Traditional transaction cards are standard magnetic strip based credit or debit cards which usually contain information pertaining to the cardholders, such as names and account numbers, printed and/or embossed on the surface of the cards. These transaction cards also contain a magnetic strip on the back of the cards which is encoded with data pertaining to the cardholders.

Recently developed transaction cards are integrated circuit (IC) cards, known as smart cards, which also contain one or more embedded computer chips capable of storing various types of information in electronic form supporting multiple applications with sophisticated security mechanisms. The computer chips can either be micro-controller chips with internal memory or memory chips with non-programmable logic. The smart cards may be available as either contact smart cards which require insertion into a smart card reader with a direct connection to a conductive micro-module on the surface of the smart cards, or contact-less smart cards which require only close proximity to a smart card reader and use respective antenna for radio frequency transmission through the surface of the smart cards. These cards can interface with a point-of-sale terminal, an automatic teller machine (ATM), or a card reader integrated into a telephone, a computer, a vending machine, or any other appliance for a wide variety of applications. Example smart card applications include, but are not limited to: (1) banking and finance market for credit/debit cards, electronic purse (stored value cards) and electronic commerce; (2) network based transaction processing such as mobile phones (GSM cards), pay-TV (subscriber and pay-per-view cards), communication highways (Internet access and transaction processing); (3) transportation and ticketing market (access control cards for mass transit ticketing, urban parking and electronic toll collection); (4) government cards (ID cards and driver licenses); (5) healthcare market (health insurance cards and medical file access cards).

The micro-controller chip embedded in each smart card allows the card to undertake a range of computational operations, protected storage, encryption and decision making. Such a micro-controller chip typically includes a microprocessor, memory, and other functional hardware elements, and may be programmed with various types of functionality, including applications such as stored-value; credit/debit; loyalty programs, etc.

FIG. 1 illustrates one example of a smart card implemented as a processor card. As shown in FIG. 1, such a smart card 10 has an embedded micro-controller chip 12 that includes a microprocessor 14, a random access memory (RAM) 16, a read-only memory (ROM) 18, a non-volatile memory 20, a cryptographic module 22, and a card reader interface 24. Other features of the micro-controller may be present but are not shown, such as a clock, a random number generator, an interrupt control, a control logic, a charge pump, power connections, and interface contacts that allow the card to communicate with the outside world.

Microprocessor 14 may be any suitable central processing unit (CPU) for executing commands and controlling the device. RAM 16 may serve as storage for calculated results and as stack memory. ROM 18 may store the operating system, fixed data, standard routines, and look up tables. Non-volatile memory 20, such as EPROM or EEPROM, may serve to store information that must not be lost when the card is disconnected from a power source but that must also be alterable to accommodate data specific to individual cards or any changes possible over the card lifetime. This information may include a card identification number, a personal identification number, authorization levels, cash balances, credit limits, etc. Cryptographic module 22 may be an optional hardware module used for performing a variety of cryptographic algorithms. Card reader interface 24 may include the software and hardware necessary for communication with the outside world. A wide variety of interfaces are possible. By way of example, interface 24 may provide a contact interface, a close-coupled interface, a remote-coupled interface, or a variety of other interfaces. With a contact interface, signals from the micro-controller chip 12 are routed to a number of metal contacts on the outside of the card which come in physical contact with similar contacts of a card reader. Various mechanical and electrical characteristics of smart card 10 and aspects of its interaction with a card reader are defined by the following specifications, all of which are herein incorporated by reference. Visa Integrated Circuit Card Specification, (Visa International Service Association 1996). EMV Integrated Circuit Card Specification for Payment Systems, (Visa International Service Association 1996). EMV Integrated Circuit Card Terminal Specification for Payment Systems, (Visa International Service Association 1996). EMV Integrated Circuit Card Application Specification for Payment Systems, (Visa International Service Association 1996). International Standard, Identification Cards—Integrated Circuit(s) Cards with Contacts, Parts 1–6 (International Standards Organization 1987–1995).

Prior to issuance of a smart card to a cardholder, smart cards that have applications that use information about an individual cardholder or an account must go through card personalization. Generally, those smart cards must be initialized and/or personalized typically at the same time with data that is specific to a card application and an individual cardholder. "Initialization" may refer to the process of programming the micro-controller chip with data that is common to a large number of cards while also including a minimal amount of card unique terms (e.g., card serial number and personalization keys). For example, during initialization or pre-personalization, the smart card may be loaded with at least one application, such as credit or stored cash value, a file structure initialized with default values, and some initial cryptographic keys for transport security. "Personalization" may refer to the process of printing or embossing data on the surface of the card (such as printed characters with metallic or colour tipping, color and black/white photographs, graphics and bar codes), encoding the magnetic strip on the card, and programming data into micro-controller chip of the card. Once a card is initialized, the smart card may be loaded with data which uniquely identifies the card during personalization. For example, personalization data may include a maximum value of the card, a personal identification number (PIN), the currency in which the card is valid, the expiration date of the card, and cryptographic keys for the card.

Before the smart card can be initialized and/or personalized, however, a cardholder data file obtained from cardholder databases must first be prepared, typically in-house (sometimes by out-source) by the card issuer, and then often passed to an external card personalization bureau in a composite personalization file format ready for card personalization. The data file obtained from the cardholder database may contain information such as, embossing data, magnetic strip data, a printed carrier for card delivery purposes, and possibly photographic data. For smart card applications, such data file is typically prepared by a separate, especial pre-personalization data preparation process commonly known in the industry as P3 (personalization preparation process) process. The P3 process involves three main stages—establishing cryptographic keys, generating Issuer Certificates using secret and public key pairs via Certification Authority, and preparing cardholder data to produce a P3 output file of cardholder data that can be processed by a separate card personalization system.

FIGS. 2A–2C provide an overview of a smart card issuance process as described using separate pre-production data preparation (P3) processing and smart card personalization systems to issue a smart card to a cardholder. In particular, FIGS. 2A–2B illustrates an example smart card issuance process for performing pre-production data preparation (P3) process and card personalization process. FIG. 2C illustrates a corresponding smart card issuance arrangement using a P3 processing system and a separate card personalization system to perform P3 process and card personalization process.

As shown in FIGS. 2A–2B, the smart card issuance process requires obtaining a data file of cardholder data at block 210, performing pre-production data preparation (P3) process (such as establishing cryptographic keys, generating Issuer Certificates using secret and public key pairs via Certification Authority, and preparing cardholder data) at block 220, and generating a personalization file of cardholder data for card personalization at block 230. Once the personalization file is generated, via pre-production data preparation (P3) process, usually sometimes in advance of card personalization, such personalization file is then obtained by an external personalization bureau at block 240. The smart card issuance process then requires performing card personalization process (such as printing or embossing data on the surface of the card, encoding the magnetic strip on the card, and programming cardholder data into micro-controller chip of the card) at block 250, and finally issuing a personalized smart card at block 260.

As shown in FIG. 2C, the smart card issuance arrangement 100 used to perform the smart card issuance process shown in FIGS. 2A–2B includes a card issuer system 110, a P3 processing system 120, and a card personalization system 130. The card issuer system 110 may be arranged in-house of a card issuer to generate a data file of cardholder data as shown in FIG. 2A, step 210. The P3 processing system 120 may be arranged (typically in-house of a card issuer) to receive the data file generated from an existing application and add the appropriate data for the smart card applications, via pre-production data preparation (P3) process, to generate a personalization file in a format ready for card personalization as shown in FIG. 2A, steps 220–230. The card personalization system 130 may be arranged at an external personalization bureau at a remote location from the card issuer to obtain and then process the data file for personalizing a smart card 10 (including chip data, magnetic strip, embossing, printing, and any scheme specific requirements), and finally issue a personalized card 10 as shown in FIG. 2B, steps 240–260. The smart card 10 as inserted into such card personalization system 130 may be available in batches and all may have previously been initialized or pre-personalized by a card supplier (not shown).

The card issuer system 110 may include a PC 112 or an industry-standard workstation which maintain databases of cardholder records and a host security module (HSM) 114. The P3 processing system 120 may include a PC 122 or an industry-standard workstation which uses a Window NT platform and a host security module (HSM) 124. The P3 processing system 120 includes support from the Certification Authorities (not shown) operated by bankers and organizations which maintain databases of cardholder records such as VISA, MasterCard and Europay International. The card personalization system 130 may include a PC 132 which uses a Window NT platform, a host security module (HSM) 134 and one or more personalization equipments 136 which personalize a batch of smart cards 10. HSMs 114, 124 and 134 are used to provide security for the card issuer system 110, the P3 processing system 120 and the card personalization system 130. These HSMs 114, 124 and 134 are stand alone, tamper resistant dedicated hardware security devices for allowing cryptographic keys to be stored securely without risk of exposure to operators of the system or to any external organizations.

However, current techniques for card personalization and card issuance as shown in FIGS. 2A–2C tend to be time consuming, cumbersome and expensive. Typically, the cardholder data must be "prepared" via P3 processing system 120 in advance (usually overnight), and then "personalized" via high volume personalization equipment via card personalization system 130 the following morning. Initial capital expenditures for hardware and software for card personalization can be very expensive. Moreover, separate sets of skilled labor (software development staff) are necessarily required for data preparation, via pre-production data preparation (P3) process, including handling sensitive cryptographic keys and cardholder data usually in-house at a card issuer location, and separately for card personalization at an external personalization bureau. Furthermore, there are many limitations and problems associated with current card personalization systems.

For example, one major limitation of current card personalization systems is that most card personalization systems rely heavily on one brand of hardware security module (HSM) which requires custom firmware every time a new smart card application becomes available.

Another major limitation of current card personalization systems is that multiple hardware security modules (HSMs) are necessarily employed for different functions. For instance, a VISA card issuer which issues a VISA smart cash card will need to use at least two (2) separate HSMs, one HSM 124 for pre-production data preparation (P3) processing and another HSM 134 for card personalization as shown in FIGS. 2A–2C. This is because both HSMs are running different firmware despite both HSMs may share the same model and the same manufacturer. Such firmware requirement contributes to the high cost of card personalization.

Yet another major limitation of current card personalization systems is also that many card personalization systems do not permit a more inclusive, generalized card personalization process that accepts any card operating system and/or work with any personalization equipment.

Therefore, there is a need for a more flexible, low cost, low maintenance card personalization system for card personalization and card issuance.

SUMMARY OF THE INVENTION

Accordingly, various embodiments of the present invention are directed an integrated card personalization system using an "in-line" approach for seamless card personalization directly from cardholder data files to avoid duplication of hardware and eliminate the need for an overnight batch process to prepare cardholder data for card personalization. Such integrated card personalization system allows for the personalization of transaction cards such as smart cards on more flexible, low cost, low maintenance and smaller personalization systems so as to save the personalization bureau time and money, particularly on small volume production runs, and eliminate the need to hire and maintain internal software development staff with high attendant cost.

In accordance with one aspect of the present invention, a host card personalization system is provided with an operating system; and a smart card issuance application module executed by the operating system to receive a data file of cardholder data, to perform a pre-production data preparation process of cardholder data for generating a personalization file of cardholder data, and to enable card personalization of a transaction card using the personalization file for issuing a personalized card. A security card is provided within the host card personalization system for cryptographic functions needed to implement data security on the system. The smart card issuance application module contains smart card issuance application programs which are dynamic link libraries (DLLs) including executable control files compiled to perform in-line pre-production data preparation (P3) and card personalization, and a smart card application programming interface (API) which provide API commands to a personalization equipment for card personalization, via a smart card coupler installed therein. The personalization equipment corresponds to any one of proprietary Image Master™, Advantage™, Impression™, and Horizon™ systems for printing or embossing data on the surface of the card, encoding the magnetic strip on the card, and programming cardholder data into micro-controller chip of the card during card personalization.

In accordance with another aspect of the present invention, a method is provided for in-line pre-production data preparation and card personalization in a single card production system comprising: obtaining a data file of cardholder data; performing a pre-production data preparation process of cardholder data to produce a personalization file of cardholder data; and performing a card personalization process of a transaction card using personalization file to issue a personalized card.

The present invention is more specifically described in the following paragraphs by reference to the drawings attached only by way of example.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention is applicable for use with all types of transaction cards, card transaction systems for processing financial transactions for debit, credit, smart card and loyalty applications, and card issuance systems for personalizing and issuing financial, identification, membership and loyalty cards as well as smart cards for target applications, including Internet and electronic commerce, financial services, secure networks, travel and entertainment, stored-value cards, pay phones, digital wireless and GSM, national ID cards, and healthcare. However, for the sake of simplicity, discussions will concentrate mainly on a simple card personalization system for providing an in-line pre-production data preparation (P3) process during card personalization, although the scope of the present invention is not limited thereto.

Figure 1:
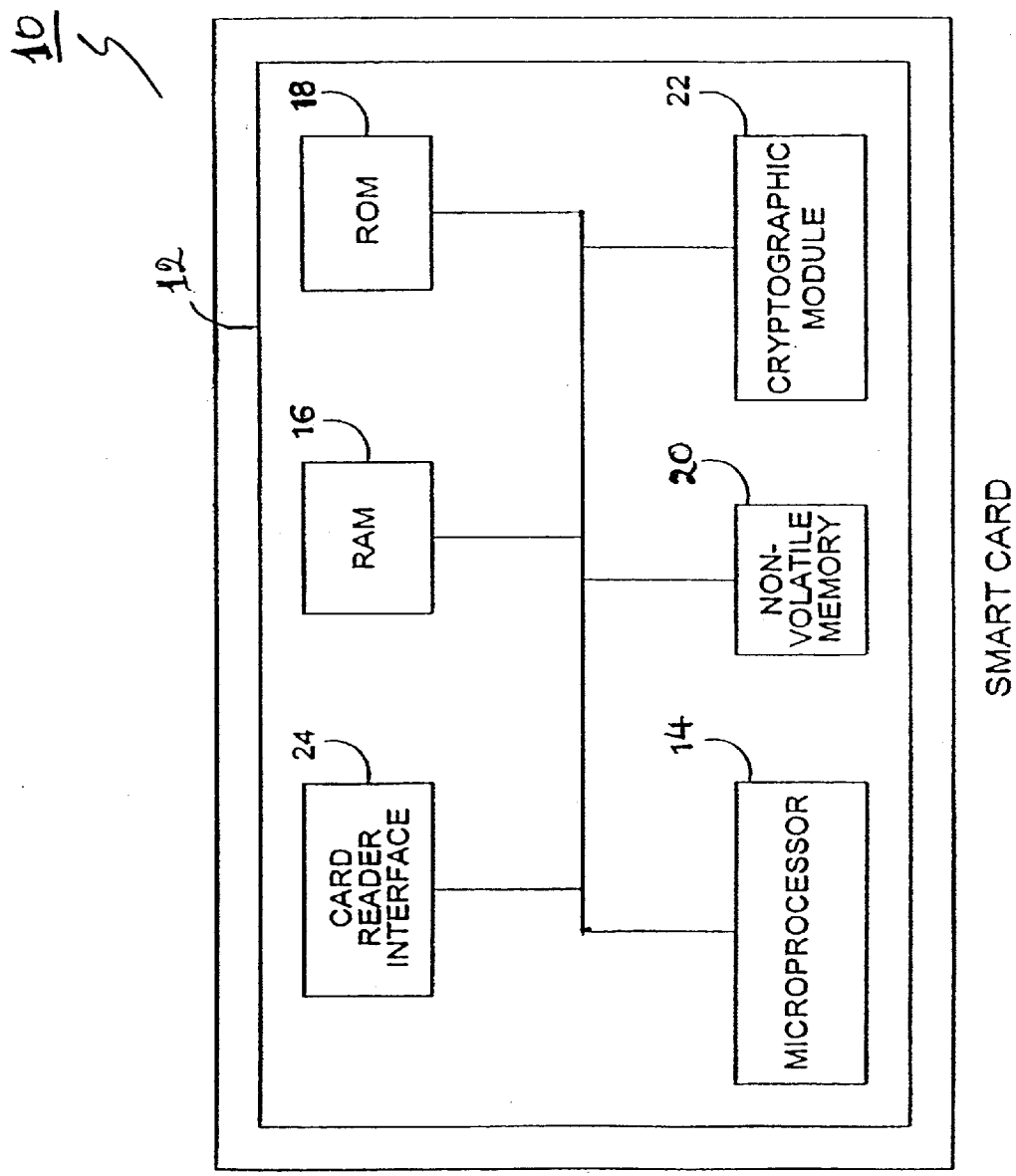
FIG. 1 illustrates a block diagram of an example smart card.
Figure 2B:
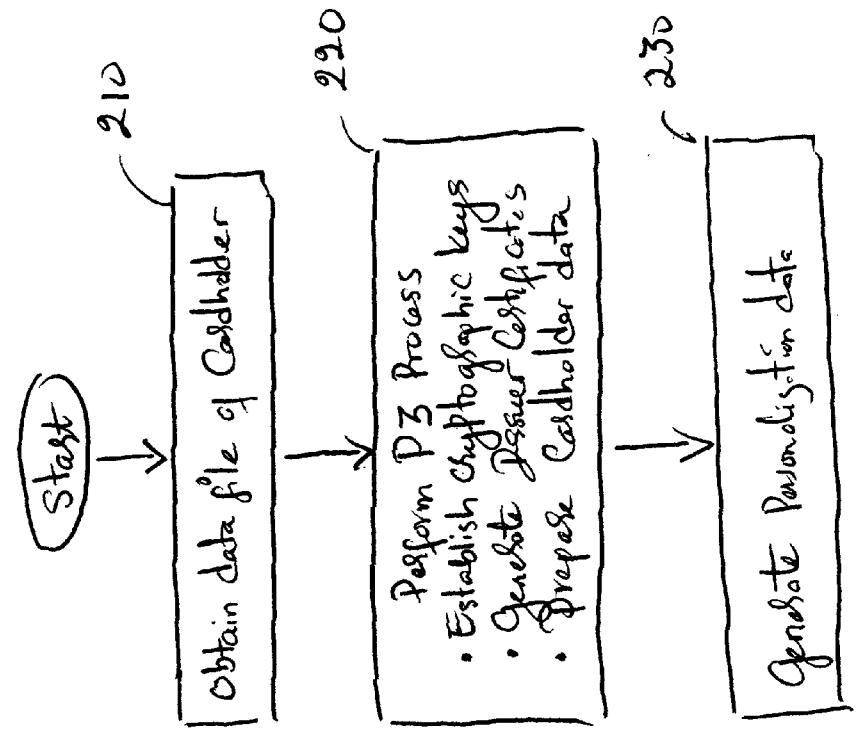
FIGS. 2A–2C illustrates an overview of a smart card issuance process using a P3 processing system and a separate card personalization system to issue a smart card to a cardholder.
Figure 2A:
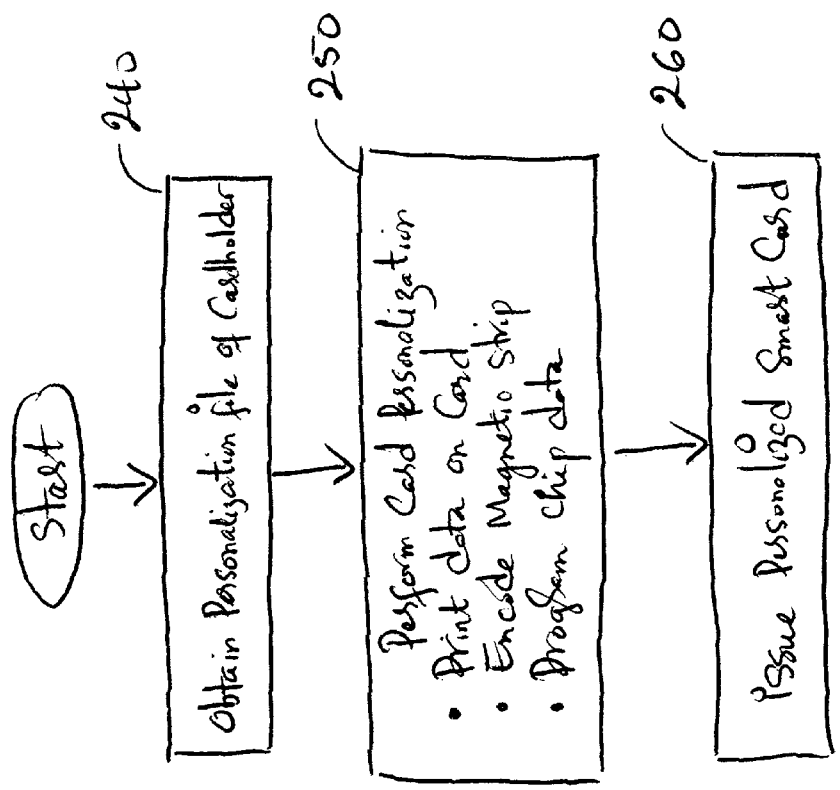
Figure 2C:
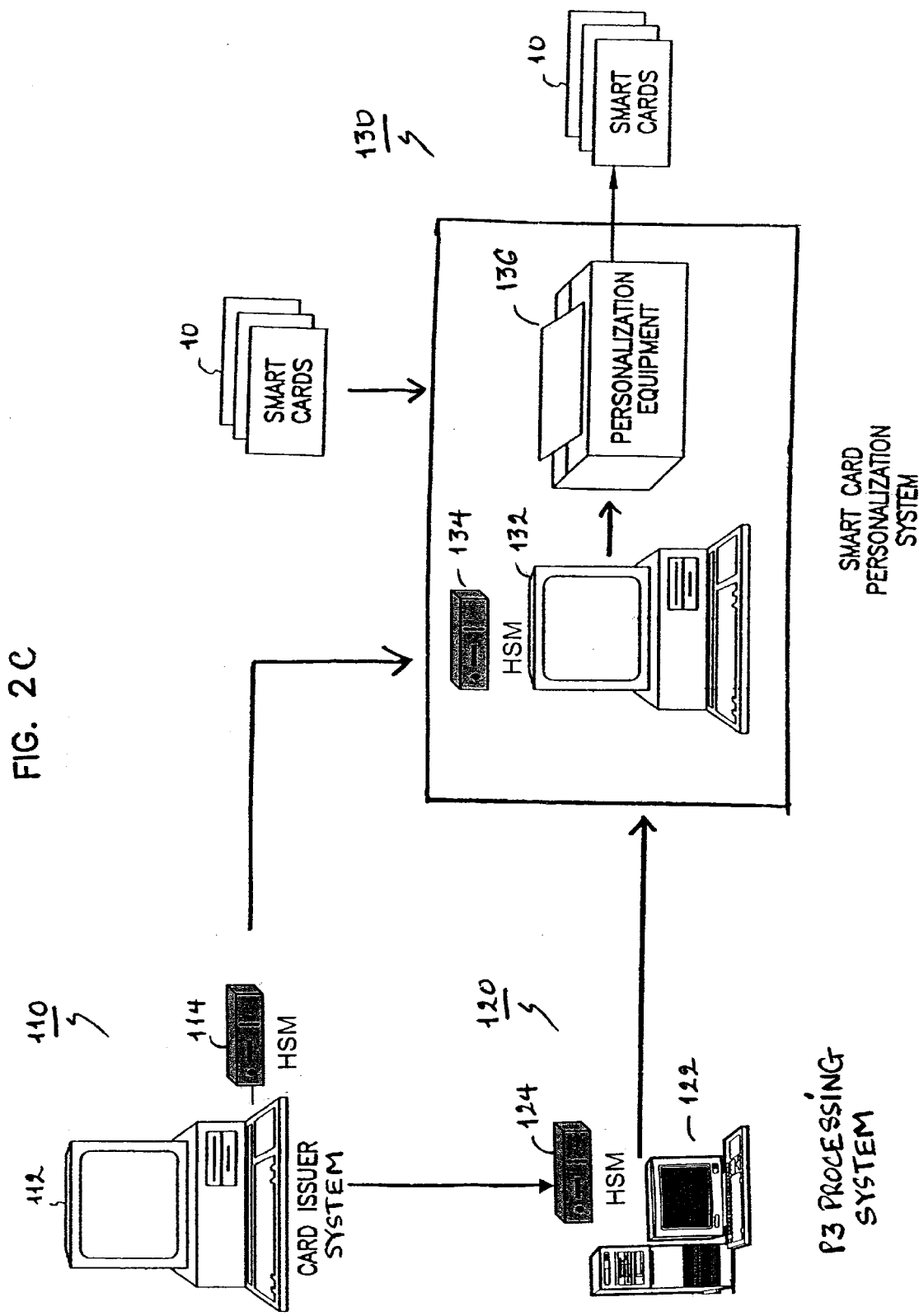
Figure 3:
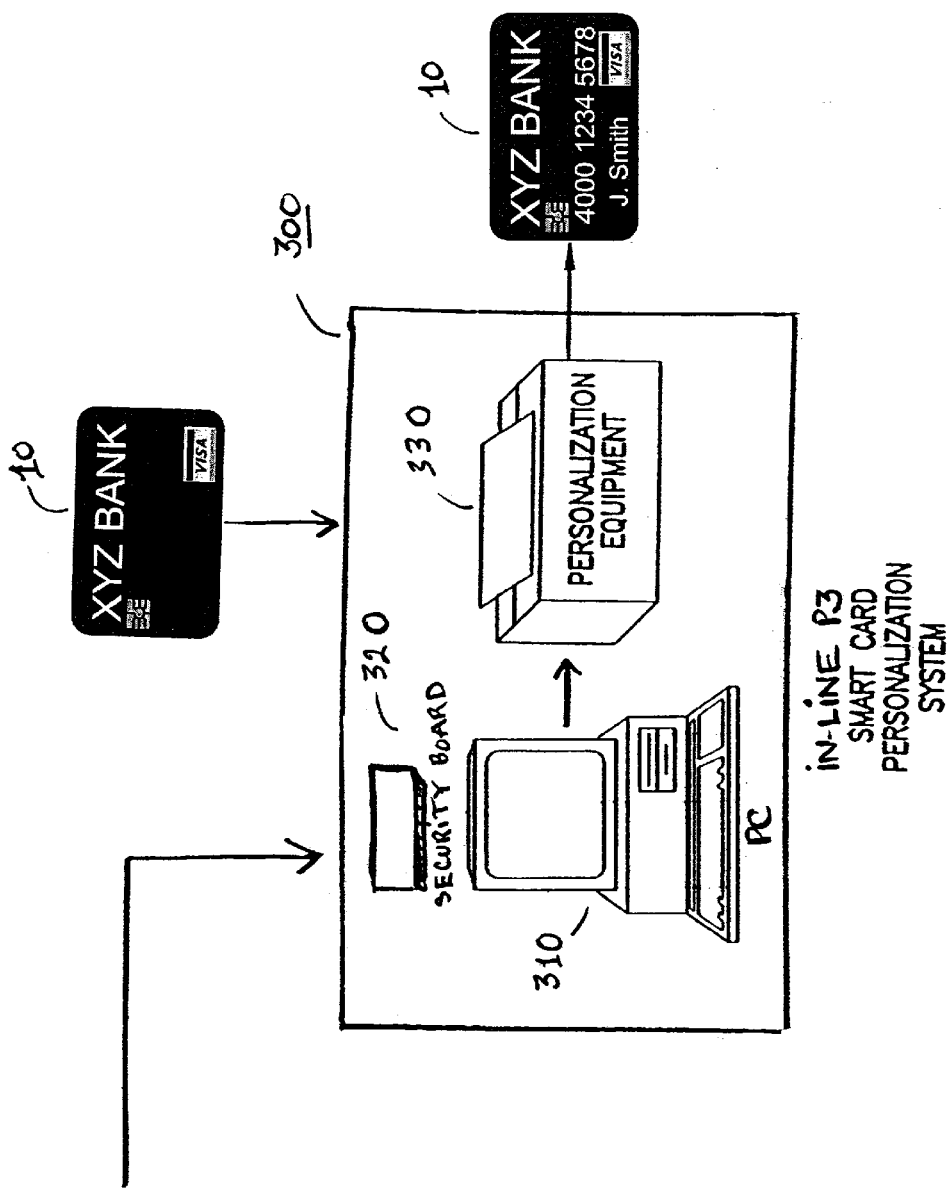
FIG. 3 illustrates an example integrated card personalization system for providing an in-line pre-production data preparation (P3) process during card personalization according to an embodiment of the present invention.
Figure 3:
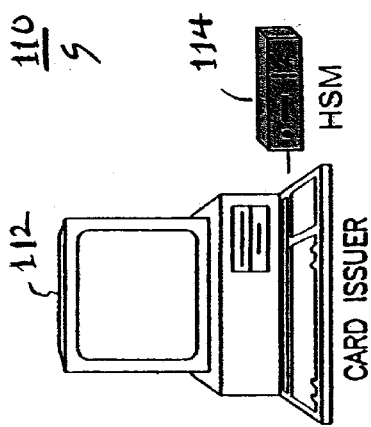

Attention now is directed to the drawings and particularly to FIG. 3, an example integrated card personalization system for providing an in-line pre-production data preparation (P3) process during card personalization according to an embodiment of the present invention is illustrated. As shown in FIG. 3, the integrated card personalization system 300 may include a host system 310 having a security board 320 installed therein for providing cryptographic functions needed to implement data security on the host system 310, and one or more personalization equipments 330. The host system 310 also contains an operating system (not shown) such as Unix, Linux, Sun Solaris, Windows 95®, Windows 98®, Windows NT® or OS/2, and an especially designed smart card issuance application module implemented as part of an overall card production software module, known as NBS Conquest® software for supporting a library of different chip operating systems, personalization equipments and security modules in order to provide real time scalable in-line pre-production data preparation, known as P3 process, and personalization solutions to a single and multiple application transaction cards including any type or model of smart cards, from any card supplier. The Conquest® software and the smart card issuance application module implemented according to an embodiment of the present invention may be written in any one of the C-family (e.g., C or C++) code languages.

The smart card issuance application module may be executed under such standard operating system and on industry-standard workstation and/or desktop personal computer (PC) hardware for allowing the user to design card layouts that customize the cards to a set of specification, to implement a pre-personalization data preparation (P3) process (such as establishing cryptographic keys, generating Issuer Certificates using secret and public key pairs via Certification Authority, and preparing cardholder data), to perform batch personalization of smart cards (such as printing or embossing data on the surface of the card, encoding the magnetic strip on the card, and programming cardholder data into micro-controller chip of the card) all in a time effective real time process. However, both the Conquest® software and the smart card issuance application module may also be written in any standard programming language included in the non-exhaustive list of Basic, Pascal and Java. In either situation, the smart card issuance application module for providing real time scalable in-line pre-production data preparation, known as P3 process, and personalization solutions to a single and multiple application transaction cards may be provided on a tangible medium, such as a floppy disk or compact disk (CD) ROM, or via Internet downloads, which may be available for a network administrator to conveniently plug-in or download into the host system 310. Alternatively, the smart card issuance application module may also be available as a firmware module or a comprehensive hardware/software module which may be built-in the host system 310.

As a preferred embodiment of the present invention, the security board 320 may be an internal adapter card installed within the host system 310 so as to save space and cost as well as to eliminate the need of multiple hardware security modules (HSMs). However, a single stand-alone hardware security module may also be arranged in connection with the host system 310 to provide a wide range of cryptographic services with high levels of security and high throughput rates. Examples of low cost and low maintenance security cards include, but are not limited to, ERACOM PC Access Security Module (ERACOM Encryptor/CAS-7000) for VISA Chip Card personalization. Examples of hardware security modules (HSMs) include, but are not limited to, Racal RG7000 Series host security modules implemented to provide a variety of protocol and connectivity options, including Ethernet TCP/IP and UDP, IBMO Channel Interface (FIPS 60), SDLC, RS-499 Interface, RS-232 Interface or V.35 Interface. In either situation, all security cards support Data Encryption Standards (DES) and public-key cryptosystems (RSA) which are in compliance with VISA's security requirements such as VISA Consolidated PIN Security Standards Requirement Manual, Section 4, "Key Management and Security" and VISA International Security Standard For Vendors, Section 7, "Security and Cryptographic Key Requirements." These security cards provide support for generation and transfer of keys such as Key Encrypting Key (KEK), PIN Encryption Key (PEK) and Message Authentication Key (MAK) to and from the card supplier, card issuer and the party personalizing the cards. The main purpose of KEK, PEK and MAK is to encrypt confidential information and to calculate a Message Authentication Code (MAC) on the message to ensure that data is not corrupted or modified whist in transfer.

The host system 310 receives a data file of cardholder data from a card issuer system 110 (typically proprietary to the card issuer), usually on computer media, such as magnetic tape, floppy disk, or CD ROM. Alternatively, the cardholder data may be input through an on-line connection such as a general switched telephone network, a packet-switched network, i.e., the Internet, a dedicated line, or a cable/satellite television signal. Such cardholder data may contain information about each individual cardholder, such as name, account number, card expiration date, and applicable services.

The host system 310 then prepares such data file of cardholder data in accordance with P3 process (such as establishing cryptographic keys, generating Issuer Certificates using secret and public key pairs via Certification Authority) to produce a personalization file of cardholder data to personalization equipment 330 for performing card personalization process (such as printing or embossing data on the surface of the card, encoding the magnetic strip on the card, and programming cardholder data into micro-controller chip of the card) in real time directly from the cardholder data file to eliminate the need for an overnight batch process to prepare cardholder data for card personalization.

The card issuer system 110 manages the cardholder data and determines the type of card to issue, the card applications to embed in the card, and what personalization equipment to use to issue the card for a particular cardholder. Such card issuer system 110 may typically be a computer program, but may also be capable of receiving data from alternate inputs, such as a person inputting the data from a telephone keypad.

The host system 310 typically accesses database records which define various types of cards and card operating systems, card applications, and personalization equipments. The logical functions of the software and the database may be distributed among computers in a client/server network or centralized into a single processor. The functions may also be distributed across processors connected through networks such as standard local area networks (LANs), wide area networks (WANs), dedicated phone lines or other communication means used to loosely couple processors.

Personalization equipment 330 corresponds to, but is not limited to, a card printer or an embossing device which available in a wide variety of models with different throughput data and printing capabilities, any where from a simple one card printer for producing test cards up to a high end card production system using laser engraving technology for producing thousands and thousands of transaction cards per hour integrated.

As a preferred embodiment of the present invention, however, such personalization equipment 330 may correspond to any one of the entire product family of currently available card personalization equipments manufactured by the Assignee of the present invention, for example; (1) NBS ImageMaster™ which is a monochrome printer with magnetic strip encoding, PCMCIA font cards and smart card technology; (2) NBS Advantage™ 2000—M1, M2, M3 which is a monochrome printer with embossing, tipping, magnetic strip encoding, indent printing and smart card technology; (3) NBS Impression™ (also known as Javelin 310) which is an on-demand desktop full color card printer with magnetic strip encoding, monochrome printing for text/bar code and smart card technology; and (4) NBS Horizon™ which is a high volume, high speed printer with embossing, tipping, magnetic strip encoding, indent printing, monochrome graphics printing, color graphics printing, label affixing, document/envelope insertion and smart card technology. Details and structures of many of these current personalization equipments manufactured by the Assignee are described, for example, in U.S. Co-Pending application Ser. No. 09/271,160 for Credit Card Embossing System, Embosser And Indent Imprinter, And Method Of Operation filed on Mar. 17, 1999, and U.S. Pat. No. 5,967,039 for Credit Card Imprinter issued to Kennedy, U.S. Pat. No. 5,920,055 for Card Transport Mechanism And Method Of Operation issued to Roth et al., U.S. Pat. No. 5,837,991 for Card Transport Mechanism And Method Of Operation issued to LaManna et al., U.S. Pat. No. 5,503,514 for Card Embossing Machine And Method issued to LaManna et al., U.S. Pat. No. 5,460,089 for Flatbed Credit Card Imprinter issued to Kennedy, U.S. Pat. No. 5,189,953 for Electric Motor Driver Imprinter issued to Kennedy, and U.S. Pat. No. 4,969,760 for Card Embossing Machine And Method issued to LaManna, all of which are assigned to the Assignee of the present invention, and all are incorporated by reference herein.

If the personalization equipment 330 is any one of the Image Master™, Advantage™ and Impression™ printers, the host system 310 may be an industry-standard workstation and/or desktop personal computer (PC) running on the NBS Conquest® card production software and smart card issuance application module implemented to provide real time scalable in-line pre-production data preparation (P3), and personalization solutions to all types of transaction cards including smart cards. However, if the personalization equipment 330 is the Horizon™ system, the host system 310 may either be a desktop PC or preferably integrated into the Horizon system along with the smart card issuance module for providing scalable in-line pre-production data preparation (P3), and personalization solutions. As a result, the Horizon™ system may then act as a host system for running the NBS Conquest® card production software and smart card issuance application module for providing scalable in-line pre-production data preparation (P3), and personalization solutions. Such integration offers a single personalization system which simplifies the complex pre-production data preparation (P3) process and the card personalization process of single and multiple application smart cards in real time efficiently.

However, the personalization equipment 330 as described with reference to FIG. 3 may not be limited to any one of the Image Master™, Advantage™, Impression™, and Horizon™ systems. Such personalization equipment 330 may also correspond to any one add-on smart card interface devices installed on existing non-smart card personalization equipments for performing printing and embossing functions, and devices such as large volume card printer/embossers, small volume card printer/embossers, automatic teller machines (ATMs), point of sale terminals, unattended kiosks, personal computers, network computers, and on-line telecommunication devices. The physical connections between the devices and the host system 310 may vary according to the manufacturer and model of the device. Common industry standard connections include serial RS232, SCSI (Small Computer System Interface), Ethernet, and serial TTL (Transistor-Transistor Logic). In addition, some devices require a proprietary bus connection. The connections between the host system 310, the card issuer system 110 and the personalization equipment 330 may also be implemented through standard local area networks, wide area networks, dedicated phone lines, or other remote communication infrastructure used to transfer to data.

Figure 4:
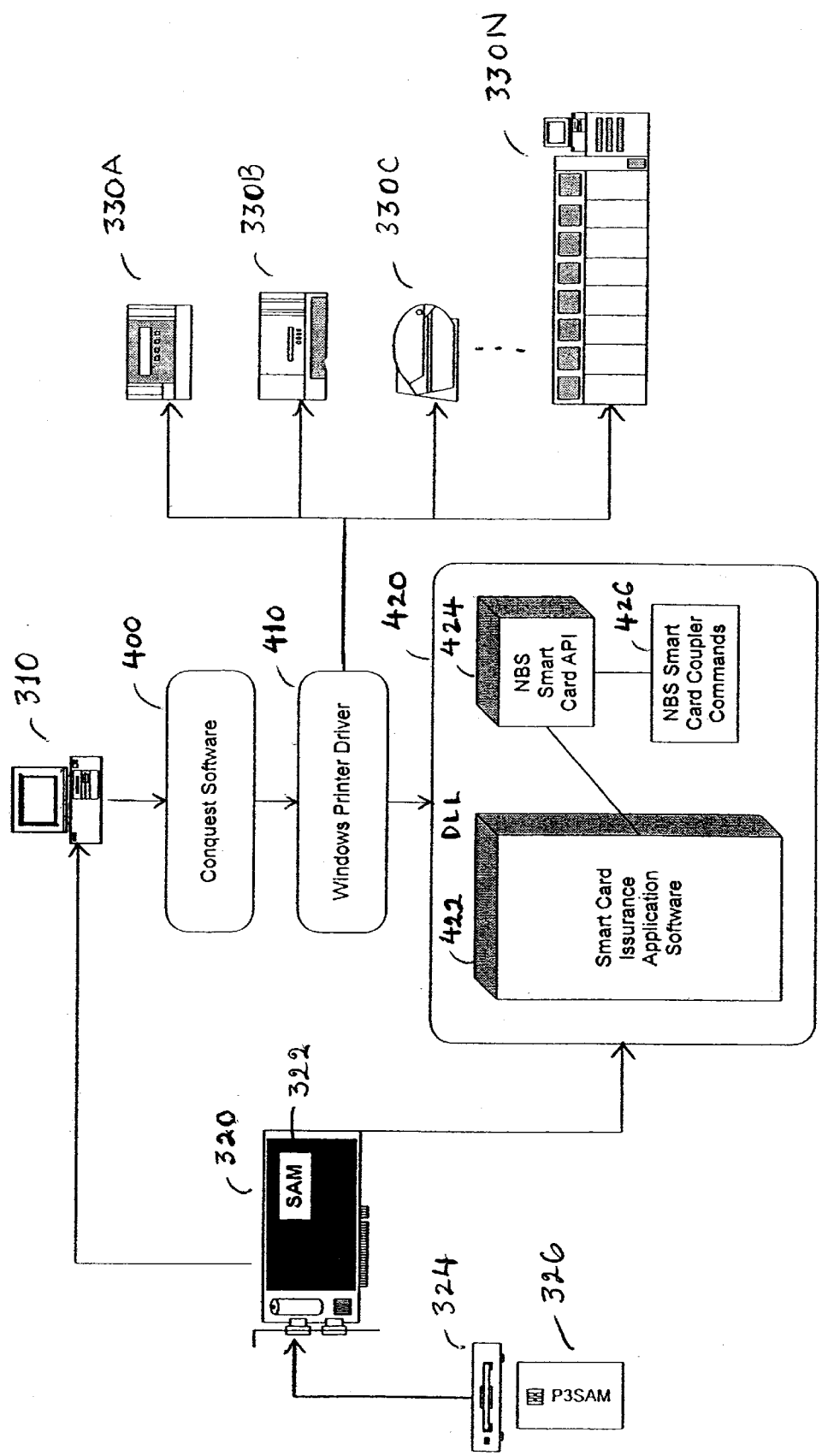
FIG. 4 illustrates an example system overview of an integrated card personalization system for providing an in-line pre-production data preparation (P3) process during card personalization according to an embodiment of the present invention.

Turning now to FIG. 4, a system overview of an integrated card personalization system for providing an in-line pre-production data preparation (P3) process during card personalization according to an embodiment of the present invention is illustrated. As shown in FIG. 4, the NBS Conquest® card production software 400 executed by the host system 310 contains a Windows based printer driver 410 selected from many drivers available to support a designated one of many available personalization equipments 330A–330N, including the Image Master™, Advantage™, Impression™, and Horizon™ systems, and a smart card issuance application module 420 implemented to provide necessary interface, perform application specific configuration, application specific data preparation etc., and to provide real time scalable in-line pre-production data preparation, known as P3 process, and personalization solutions to a single and multiple application transaction cards including any type or model of smart cards, from most card suppliers.

The smart card issuance application programs 422 may also include a smart card application programming interface (API) 424 which provide API commands to a smart card coupler (not shown) installed in a selected personalization equipment 330A, 330B, 330C or 330N. At least one set of smart card coupler commands 426 may be provided to develop smart card application programs 422 for card personalization.

The smart card issuance application programs 422 may also include a smart card application programming interface (API) 424 which provide API commands to a smart card coupler (not shown) installed in a selected personalization equipment 330A, 330B, 330C or 330N. At least one set of smart card coupler API may be provided to develop smart card application programs 422 for card personalization.

One example of smart card issuance applications 422 for providing in-line pre-production data preparation (P3) and card personalization solutions for smart cards may relate to a VISA CASH card. Personalization (P3) file of cardholder data may be prepared in real time just prior to the personalization of a VISA CASH card. The result of the personalization preparation process may be stored in an internal buffer instead of a file. A set of P3 personalization commands for the security board 324 include to retrieve version number for a BIN from P3SAM card 326, to authenticate the P3SAM 326 as inserted in the card reader 324 to the P3SAM card 326, to generate Diversified Load Key (KDL) and Diversified Update Key (KDU) using the Master Load Key (KML) and the Master Update Key (KMU), to generate a Derived Purchase Key (KDP) derived possibly from the Issuer Purchase Key (KIP), and to generate the two signatures required to update a parameter on VISA Cash Card.

General instruction sets of the in-line pre-production data preparation (P3) and card personalization process of the smart card issuance applications 422 executed to perform in-line pre-production data preparation (P3) and card personalization process may be provided in C or C++ code language as follows:

```
Call to the "HSM-P3- Get KMA Version number" command.
Call to the "HSM-P3-Authenticate a P3SAM card" command.
Loop for each VISA CASH card to be personalized
{
    Issue a SELECT MF command to select Card Domain.
    Issue a GET DATA command for tag 9F6F to get KMC key
    information.
    Issue a GET DATA command for tag 0042 to get Issuer BIN.
    Issue a SELECT FILE command to select VISA CASH Application.
    Issue a READ BINARY DATA command to retrieve the IDiep
    from the EFiep.
    Call to the "HSM-P3-Generate KDL and KDU" command.
    Call to the "HSM-P3-Generate KDP" command.
    Build a temporary P3 output buffer.
    Rearrange Tag order before writing onto the VISA CASH card.
    Loop for each tag data in the temporary P3 output file
    {
        Call to the "HSM-Personalization-Update Card Parameter"
        command.
        Issue an INITIALIZE IEP for Update command.
        Issue an UPDATE IEP Parameter command.
        Check and compare the returned signature.
    }
}
```

More details of the in-line pre-production data preparation (P3) and card personalization process of the smart card issuance applications 422 may be provided in the Appendix.

The security board 320 may contain a Secure Application Module (SAM) 322 customized for specific functions. The SAM 322 can be either down-loaded each time the security board 320 is powered up or can be stored in a flash memory module on the security board 320 (if the security board 320 is an ERACOM CSA-7000) without firmware development and chip changes from the hardware security module manufacturer. In either situation, the SAM 322 may be provided encrypted and digitally signed by the Certificate Authority to ensure secure and safe operation of cryptographic keys. Optional external card reader 324 and smart card P3SAM 326 may be provided for specific application, for example, VISA CASH card, prior to pre-production data preparation (P3) and card personalization.

During card personalization, cardholder data may be printed and embossed on the surface of the card and/or data encoded in a magnetic stripe on the card. For smart cards, data may also be stored in an internal memory area within the micro-controller of the card. The same data may be placed on the surface of the card, in the magnetic stripe and also in the chip memory. The exact configuration of the data in and on the card will vary depending on the type of smart card being issued and the requirements of the card issuer.

As described from the foregoing, the present invention advantageously provides a single card issuance system for providing in-line pre-production data preparation (P3) and card personalization directly from cardholder data files in real time in order to eliminate duplication of hardware and the need for an overnight batch process to prepare cardholder data for card personalization. Such integrated card personalization system allows for the personalization of transaction cards such as smart cards on more flexible, low cost, low maintenance and smaller personalization systems so as to save the personalization bureau time and money, particularly on small volume production runs, and eliminate the need to hire and maintain internal software development staff with high attendant cost While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the present invention is applicable to all types of transaction cards, including magnetic strip credit/debit cards, and smart cards. The smart card personalization system 300 may encompass alternate embodiments of the software program in which the functions of the system are performed by modules different than the smart card issuance application module 420 shown in FIG. 4. The smart card personalization system 300 may process the data in a serial or parallel fashion, or a combination of the two, without departing from the spirit or scope of the invention. The software program may be written in one of several widely available programming languages and the modules may be coded as subroutines, subsystems, or objects depending on the language chosen. Similarly, data used by the system 300 may be described and represented as, but may not be limited to, logical records embodied in a database, nor is the use of any particular type of data management system implied. Relational database systems may provide the necessary infrastructure for managing the underlying data in the system, whether it is centralized or distributed, but other organizational data structures, i.e., indexed flat files, may be substituted without exceeding the scope of the invention. Furthermore, alternate embodiments of the invention which implement the system in hardware, firmware, or a combination of both hardware and software, as well as distributing the modules and/or the data in a different fashion will be apparent to those skilled in the art and are also within the scope of the invention. Many other modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A host card personalization system, comprising:
   an operating system; and
   a smart card issuance application module executed by said operating system to enable the host card personalization system to receive a data file of cardholder data, to perform a pre-production data preparation process of said cardholder data for generating personalization data, and to perform card personalization of a transaction card using said personalization data for issuing a personalized card.

2. The host card personalization system as claimed in claim 1, further comprising a security card installed therein for providing cryptographic functions needed to implement data security on the system.

3. The host card personalization system as claimed in claim 1, wherein said pre-production data preparation process is performed by:
   generating application security keys;
   generating Issuer Certificates using secret and public key pairs via a remote Certification Authority; and
   preparing said data file of cardholder data as said personalization data in a format ready for card personalization.

4. The host card personalization system as claimed in claim 1, further comprising a personalization equipment arranged to perform said card personalization by:
   printing or embossing data on a surface of the transaction card;

encoding a magnetic strip on the transaction card; and programming cardholder data into a micro-controller chip of the transaction card.

5. The host card personalization system as claimed in claim 1, wherein said data file of cardholder data is obtained from a card issuer via an on-line connection such as a general switched telephone network, a packet-switched network, a dedicated line, or a cable/satellite a television signal.

6. The host card personalization system as claimed in claim 1, wherein said data file of cardholder data is obtained from a card issuer via computer media, such as magnetic tape, floppy disk, or compact disk read-only-memory (CD ROM).

7. The host card personalization system as claimed in claim 1, wherein said cardholder data contains information about each individual cardholder, such as name, account number, card expiration date, and applicable services.

8. The host card personalization system as claimed in claim 1, wherein said smart card issuance application module contains smart card issuance application programs which are dynamic link libraries (DLLs) including executable control files compiled to perform in-line pre-production data preparation (P3) and card personalization.

9. The host card personalization system as claimed in claim 1, wherein said smart card issuance application module includes a smart card application programming interface (API) which provide API commands to a personalization equipment for card personalization, via a smart card coupler installed therein.

10. The host card personalization system as claimed in claim 9, wherein said personalization equipment corresponds to any system which performs printing and embossing functions on the transaction card.

11. The host card personalization system as claimed in claim 9, wherein said personalization equipment corresponds to any one add-on smart card interface devices installed on existing non-smart card personalization equipments for performing printing and embossing functions.

12. The host card personalization system as claimed in claim 9, wherein said personalization equipment corresponds to one of devices such as large volume card printer/embossers, small volume card printer/embossers, automatic teller machines (ATMs), point of sale terminals, unattended kiosks, personal computers, network computers, and on-line telecommunication devices.

13. A method for providing in-line pre-production data preparation and personalization in a card production system comprising:

obtaining a data file of cardholder data from a card issuer;

performing a pre-production data preparation process of said cardholder data to obtain personalization data; and performing a card personalization process of a transaction card using said personalization data obtained directly from the pre-production data preparation process to issue a personalized card.

14. The method as claimed in claim 13, wherein said pre-production data preparation process comprises:

generating application security keys;

generating Issuer Certificates using secret and public key pairs via a remote Certification Authority; and preparing said data file of cardholder data as said personalization data in a format ready for card personalization.

15. The method as claimed in claim 13, wherein said card personalization process comprises:

printing or embossing data on a surface of the transaction card;

encoding a magnetic strip on the transaction card; and programming cardholder data into a micro-controller chip of the transaction card.

16. The method as claimed in claim 13, wherein said data file of cardholder data is obtained from a card issuer via an on-line connection such as a general switched telephone network, a packet-switched network, a dedicated line, or a cable/satellite television signal.

17. The method as claimed in claim 13, wherein said data file of cardholder data is obtained from a card issuer via computer media, such as magnetic tape, floppy disk, or compact disk read-only-memory (CD ROM).

18. The method as claimed in claim 13, wherein said cardholder data contains information about each individual cardholder, such as name, account number, card expiration date, and applicable services.

19. A computer readable medium having stored thereon a plurality of instructions which, when executed by a processor of a computer system, cause the processor to perform the steps of:

obtaining a data file of cardholder data;

performing a pre-production data preparation process of said cardholder data to produce a personalization file of said cardholder data; and enabling card personalization of a transaction card using said personalization file to issue a personalized card.

20. The computer readable medium as claimed in claim 19, wherein said pre-production data preparation process comprises:

generating application security keys;

generating Issuer Certificates using secret and public key pairs via a remote Certification Authority; and preparing said data file of cardholder data as a personalization file in a format ready for card personalization.

21. The computer readable medium as claimed in claim 19, wherein said card personalization comprises:

printing or embossing data on a surface of the transaction card;

encoding a magnetic strip on the transaction card; and programming cardholder data into a micro-controller chip of the transaction card.

22. The computer readable medium as claimed in claim 19, wherein said data file of cardholder data is obtained from a card issuer via an on-line connection such as a general switched telephone network, a packet-switched network, a dedicated line, or a cable/satellite television signal.

23. The computer readable medium as claimed in claim 19, wherein said data file of cardholder data is obtained from a card issuer via computer media, such as magnetic tape, floppy disk, or compact disk read-only-memory (CD ROM).

24. The computer readable medium as claimed in claim 19, wherein said cardholder data contains information about each individual cardholder, such as name, account number, card expiration date, and applicable services.

25. A computer system, comprising:

a host processor; and a computer readable medium having stored thereon a plurality of instructions which, when executed by the host processor, cause the host processor to:

obtain a data file of cardholder data;

prepare the data file of said cardholder data in accordance with a pre-production data preparation process to produce personalization data; and prepare card personalization of a transaction card using said personalization data to produce a personalized card.

26. The computer system as claimed in claim 25, wherein the pre-production data preparation process comprises:

generating application security keys;

generating Issuer Certificates using secret and public key pairs via a remote Certification Authority; and preparing said data file of cardholder data as personalization data in a format ready for card personalization.

27. The computer system as claimed in claim 25, wherein the host processor performs the card personalization by:

printing or embossing data on the surface of the transaction card;

encoding a magnetic strip on the transaction card; and programming cardholder data into a micro-controller chip of the transaction card.

28. The computer system as claimed in claim 25, wherein said data file of cardholder data is obtained from a card issuer via an on-line connection such as a general switched telephone network, a packet-switched network, a dedicated line, or a cable/satellite television signal.

29. The computer system as claimed in claim 25, wherein said data file of cardholder data is obtained from a card issuer via the computer readable medium.

30. The computer system as claimed in claim 25, wherein said cardholder data contains information about each individual cardholder, such as name, account number, card expiration date, and applicable services.

* * * * *